United States Patent [19]

Hashimoto et al.

[11] 4,084,373
[45] Apr. 18, 1978

[54] SECONDARY AIR SUPPLY SYSTEM FOR INTERNAL COMBUSTION ENGINES

[75] Inventors: Masanao Hashimoto; Tadashi Saitou, both of Toyota; Tatsuo Kobayashi; Isamu Suzuki, both of Oobu, all of Japan

[73] Assignees: Toyota Jidosha Kogyo Kabushiki Kaisha, Toyota; Aisan Kogyo Kabushiki Kaisha, Oobu, both of Japan

[21] Appl. No.: 698,960

[22] Filed: Jun. 23, 1976

[30] Foreign Application Priority Data

Mar. 18, 1976 Japan .................................. 51-29628

[51] Int. Cl.² ............................................. F02B 75/10
[52] U.S. Cl. ........................................... 60/293; 60/304
[58] Field of Search ................. 60/293, 304, 305, 306, 60/307

[56] References Cited

U.S. PATENT DOCUMENTS

| | | | |
|---|---|---|---|
| 3,203,168 | 8/1965 | Thomas | 60/286 |
| 3,757,521 | 9/1973 | Tourtellotte et al. | 60/301 X |
| 3,788,071 | 1/1974 | Brewer | 60/293 |
| 3,826,089 | 7/1974 | Nakajima et al. | 60/293 X |
| 3,953,969 | 5/1976 | Mori et al. | 60/293 |
| 3,982,397 | 9/1976 | Laurent | 60/306 X |
| 3,983,697 | 10/1976 | Goto et al. | 60/306 X |

Primary Examiner—Carlton R. Croyle
Assistant Examiner—Michael Koczo, Jr.
Attorney, Agent, or Firm—Birch, Stewart, Kolasch & Birch

[57] ABSTRACT

A system for supplying secondary air into the exhaust system of internal combustion engines having in combination two parallel systems, one feeding air depending upon the exhaust gas pressure pulsation and the other feeding air depending upon the delivery of an air pump driven by the output power of the engine.

8 Claims, 4 Drawing Figures

SECONDARY AIR SUPPLY SYSTEM FOR INTERNAL COMBUSTION ENGINES

BACKGROUND OF THE INVENTION

1. Field of the Invention

The present invention relates to a secondary air supply system for supplying secondary air into the exhaust system of internal combustion engines for the purpose of purifying exhaust gases.

2. Description of the Prior Art

It is apparently known in the prior art to include a secondary air supply system to inject secondary air into the exhaust system of internal combustion engines as a countermeasure for purifying exhaust gases by recombusting harmful components such as HC and CO contained in the exhaust gases by the secondary air. The conventional secondary air supply system generally comprises a rotary air pump such as a vane pump mounted on the internal combustion engine to supply compressed air delivered from the air pump into the exhaust gas passage through an air injection manifold. As an alternative, it has also been proposed to utilize exhaust gas pressure pulsation existing in the exhaust gas passage wherein air is injected into the exhaust system by employing a passage means for conducting air into the exhaust system and a check valve provided in the midst of said passage means. This arrangement permits air to flow only toward the exhaust system so that air is pumped toward the exhaust system each time a vacuum is produced in the exhaust system during pulsation of the exhaust gas pressure. When a suitable capacity air pump is used, the system is capable of feeding any quantity of air required for sufficient purification of exhaust gases over the entire operational region of the engine. However, this system reqiures a relatively large air pump, particularly when it is applied to an engine having a large piston displacement thereby causing a serious problem with regard to the space limit of the engine compartment which has to accommodate other various auxiliary units used in modern automobiles adapted for the new exhaust gas regulations. By contrast, the latter system utilizing the exhaust gas pressure pulsation has an advantage with regard to the space requirement thereof. However, this system has a limitation with regard to its air injection capacity and the capacity is generally insufficient for engines having a relatively large piston displacement. Furthermore, although it is preferable that the quantity of secondary air should be proportional to the quantity of engine intake air so that the supply of secondary air is enhanced as the rotational speed of the engine increases, the supply of air depending upon the exhaust gas pressure pulsation decreases as the rotational speed of the engine increases due to the fact that the amplitude of the exhaust gas pressure pulsation decreases as the rotational speed of the engine increases.

SUMMARY OF THE INVENTION

Therefore, it is the object of the present invention to provide an improved secondary air supply system which is advantageous in view of the space requirement of the engine compartment and the cost and yet capable of supplying enough secondary air to accomplish the required purification of the exhaust gases over the entire operational region of the engine.

According to the present invention, the abovementioned object is accomplished by a secondary air supply system for internal combustion engines comprising a first supply system which includes a passage means for conducting air into the exhaust system of the engine and a check valve provided in the midst of said passage means for allowing air to flow only toward the exhaust system so that air is introduced into the exhaust system by utilizing exhaust gas pressure pulsation, and a second system which includes an air pump driven by the output power of the engine.

In the abovementioned system, the advantages with regard to the space reqirement and the cost are still preserved by incorporating a system which depends upon both the exhaust gas pressure pulsation and an air pump driven by the output power of the engine. The system may be limited to be of a relatively small capacity supply enough air to supplement the shortage of air available from the first system which depends upon the exhaust gas pressure pulsation, particularly when the engine is operating at high speed and load conditions. Consequently, the air pump may be of a relatively small capacity when compared with those in the conventional systems thereby effecting a great advantage in view of cost and space requirement.

A small sized air pump for use in the system of the present invention may advantageously be a diaphragm pump adapted to be driven by a cam drive mechanism such as those generally incorporated in the fuel supply system of internal combustion engines. Or alternatively, a vane pump adapted to be driven by a pulley-belt system may of course be employed. Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWING

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENT

Figure 1:
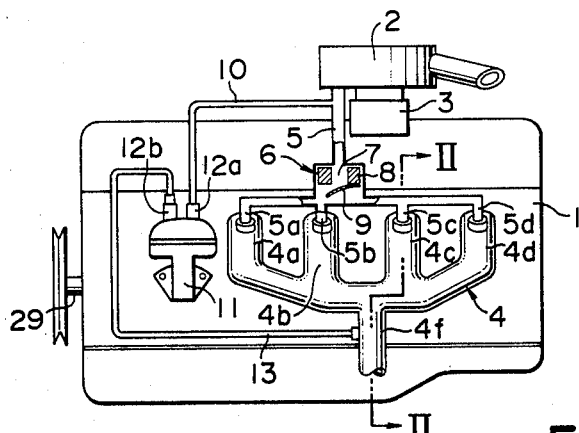
FIG. 1 is a view schematically showing the secondary air supply system of the invention incorporated in an internal combustion engine.
Figure 2:
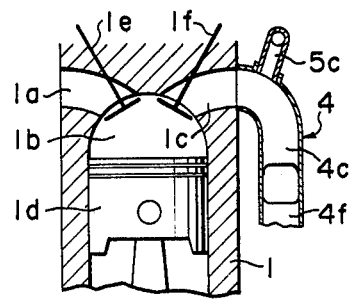
FIG. 2 is a schematic sectional view along line II—II in FIG. 1.

Referring to FIGS. 1 and 2 schematically shows the body of an internal combustion engine having an air cleaner 2 and a carburetor 3 for supplying the fuel-air mixture through an intake manifold (not shown) and intake ports 1a to the combustion chambers 1b of the individual cylinders. The combustion gases produced in the individual chambers 1b are discharged through exhaust ports 1c and branch portions 4a–4d of an exhaust manifold 4 to be collected at a collecting portion 4f and further exhausted through an exhaust pipe connected thereto. A piston 1d is reciprocably mounted in a cylinder defined in the engine body to define the combustion chamber thereabove. The intake and exhaust ports 1a and 1c are selectively opened or closed by intake and exhaust valves 1e and 1f, respectively.

The secondary air supply system incorporated in the engine shown in FIG. 1 comprises a first supply system including a manifold passage means 5 which has branch portions 5a–5d each connected with branch portions 4a–4d of the exhaust manifold 4. In this case, the branch portions 5a–5d should preferably be connected to the branch portions 4a–4d at a position as close to the exhaust port as possible so that distinguished exhaust gas pulsation is effected in individual branch portions 5a–5d. Upstream of the collecting portion of the branch portions 4a–4d there is provided a check valve 6 which allows air to flow only from the air cleaner toward the exhaust manifold. In the embodiment shown in the drawings, the check valve 6 comprises a valve seat member 8 defining a through opening 7 and a reed valve element 9 mounted at the downstream side of the valve seat member, the reed member being biased toward a valve closing position by its own elasticity and is adapted to be biased to open the through opening when a pressure difference is applied on the opposite sides thereof due to the vacuum produced in the exhaust manifold caused by exhaust gas fluctuation generated in the exhaust system.

Branched from an upstream portion of the secondary air supply manifold 5 is an air supply pipe 10 connected with an air inlet port 12a of a secondary air supply pump 11 adapted to be driven by the engine. The air delivery port 12b of the pump is connected with a conduit 13 which introduces air delivered by the pump into the collecting portion 4f of the exhaust manifold 4.

Figure 3:
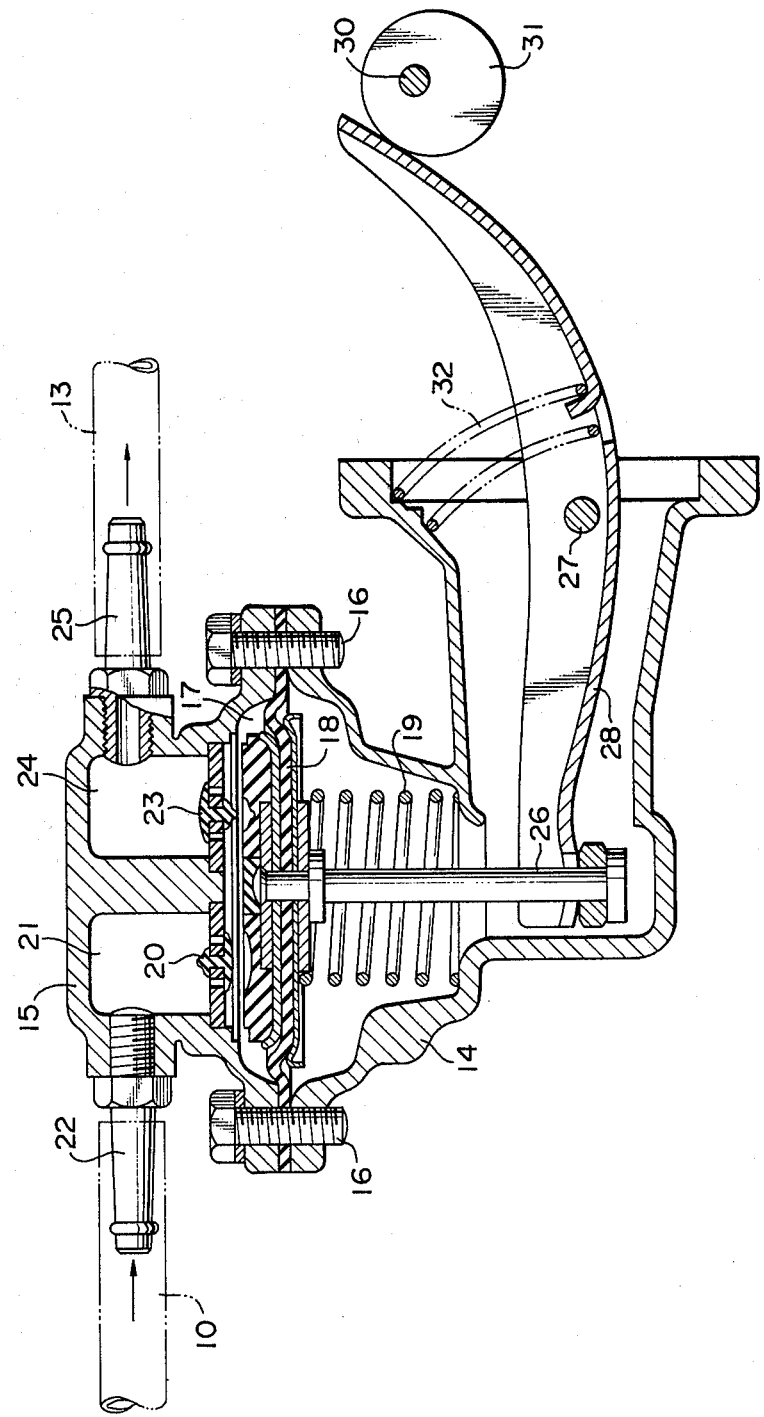
FIG. 3 is a sectional view of an air pump which is suitable for use with the system of the invention; and, FIG. 4 is a graph showing the relation between the secondary air flow rate and the rotational speed of the engine.

The secondary air supply pump 11 may for example be a cam-driven diaphragm pump. FIG. 3 shows an example of such a pump in cross section. The pump comprises a lower casing member 14 and an upper casing member 15, the latter being mounted to the former with a diaphragm member 18 interposed therebetween thereby defining a pumping chamber 17 above the diaphragm member. The diaphragm member is biased upward by a compression coil spring 19. The pumping chamber 17 is connected with an air inlet chamber 21 defined by the upper casing member via a check valve 20 which allows air to flow only from the inlet chamber 21 to the pumping chamber 17. The air inlet chamber 21 is connected with an air inlet pipe such as the pipe 10 in FIG. 1 via a nipple 22. The pumping chamber 17 is also connected with an air outlet chamber 24 defined by the upper casing member 15 via a check valve 23 which allows air to flow only from the pumping chamber to the air outlet chamber. The air outlet chamber is connected with an air outlet pipe such as the pipe 13 in FIG. 1 via a nipple 25. The diaphragm 18 is connected with the upper end of an actuating rod member 26 mounted at a central portion of the lower casing member 14, the lower end of the rod member being connected with one end of a cam follower lever 28 pivotably supported by a pivot 27. The other end of the cam follower lever is drivingly engaged with an eccentric cam 31 rotatably supported by a cam shaft 30 which is driven by the crank shaft 29 in FIG. 1 under the biasing action applied by a compression coil spring 32.

In operation, when the cam follower lever 28 is rocked counter-clockwise by the eccentric cam 31 about the pivot shaft 27, the diaphragm member 18 is biased downward in relation to FIG. 3 against the action of the compression coil spring 19 thereby air is drawn from the air inlet chamber 21 into the pumping chamber 17 through the check valve 20. On the contrary, when the cam follower lever 28 is rocked clockwise about the pivot shaft 27 under the action of the spring 32 as the eccentric cam moves away from the lever, the diaphragm member 18 is biased upward by the compression coil spring 19, thereby the air which has been drawn into the pumping chamber 17 is discharged therefrom through the check valve 23 into the air outlet chamber 24. By repetition of the above operations, pumping of air is effected.

In a secondary air supply system of the aforementioned construction, each time when a vacuum is produced in the individual branch portions 4a-4d of the exhaust manifold due to exhaust gas pulsation, the reed valve element 9 is biased downward to open the through passage 7 thereby introducing air through the air supply manifold 5 into the individual branch portions 4a-4d. At the same time, the air pump 11 feeds air drawn through the air cleaner 2 and the pipe 10 into the collecting portion 4f of the exhaust manifold through the pipe 13. Consequently, the exhaust system including the exhaust manifold 4 is supplied wth secondary air which is the sum of the air supplied by the exhaust gas pulsation and the air supplied by the air pump.

Figure 4:
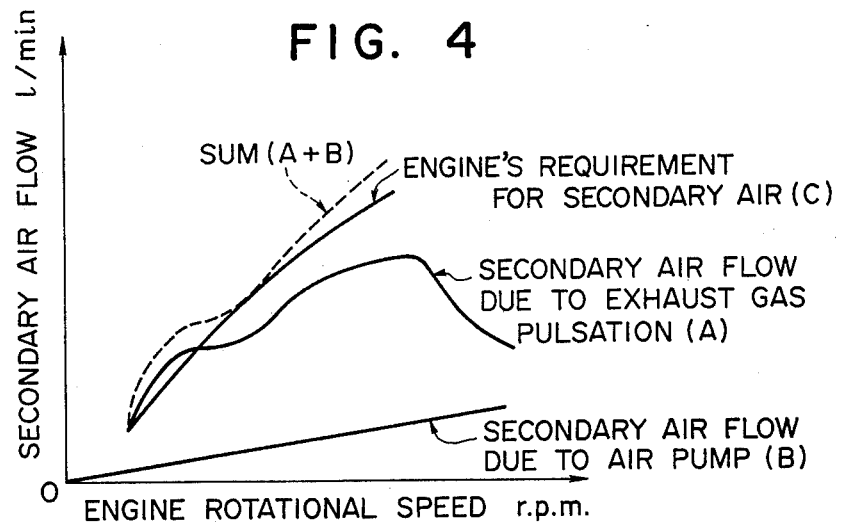

FIG. 4 shows the relation between the quantity of secondary air supplied by the system of the invention and the rotational speed of the engine. When the rotational speed of the engine is relatively low, the air supplied by the exhaust gas pulsation (A) is sufficient to cover the engine's requirement for secondary air. However, in medium and high speed operating regions, the air supplied by the exhaust gas pulsation is insufficient to meet with the engine's requirement. By supplementing the air supply depending upon the exhaust gas pulsation (A) by that depending upon the air pump (B), the total amount of air can be varied in accordance with a performance curve shown by the broken line in the graph of FIG. 4 which closely corresponds to the engine's requirement for secondary air. The air pump 11 may be of a relatively small capacity which merely supplements the shortage of air available from the exhaust gas pulsation.

Although the invention has been shown and described with respect to a preferred embodiment, it should be understood by those skilled in the art that various modifications changes and omissions in the form and detail thereof may be made therein without departing from the spirit and the scope of the invention, and all such modifications as would be obvious to one skilled in the art are intended to be included within the scope of the following claims.

We claim:

1. A secondary air supply system for an internal combustion engine which includes an output shaft and exhaust manifolds, comprising:
    a first air supply system including an air passage means having an upstream end opened to the atmosphere and a downsteam end connected to the exhaust manifold of the engine;
    a reed check valve operatively provided in said air passage means for permitting air to flow only from said upstream end towards said downstream end;

a second air supply system including an air pump operatively connected directly between the atmosphere and the exhaust manifold of the engine;

said air pump includes a diaphragm member mechanically driven from the output shaft of the engine at a speed proportional to the rotational speed of the output shaft;

said first air supply system combined with said second air supply system provides the appropriate secondary air to the engine to supply the engine with the required quantity of secondary air at all rotational speeds of the engine.

2. The system of claim 1, wherein said passage means is connected with said exhaust system at a position relatively close to an exhaust port of the engine and said second air system supplies air into a collecting portion of the exhaust manifold.

3. The system of claim 2, wherein said air pump including a diaphragm member is mechanically driven by a cam operatively driven by the output shaft of the engine; and said cam imparts motion to a spring biased rocker-arm which in turn drives the diaphragm member thus operatively pumping secondary air from the atmosphere to said collecting portion of the exhaust manifold.

4. A secondary air supply system for an internal combustion engine having an output shaft and exhaust manifolds, comprising:

a first air supply system including an air passage means having an upstream end opened to the atmosphere and a downstream end connected to the exhaust manifold of the engine;

a reed check valve provided in said air passage means for allowing air to flow only from said upstream end towards said downstream end;

a second air supply system including an air pump having an air delivery port;

a mechanical driving connection for driving said air pump from the output shaft of the engine at a speed proportional to that of the rotational speed of the output shaft;

an air conduit means connecting said air delivery port of said air pump to the exhaust manifold of the engine; and said air conduit means being a direct conduit and free of control valve means positioned therein.

5. The system of claim 4, wherein said passage means is connected with said exhaust system at a position relatively close to an exhaust port of the engine.

6. The system of claim 5, wherein said passage means comprises a manifold portion including a plurality of branch pipes each being connected with a branch pipe of said exhaust manifold incorporated in the exhaust system.

7. The system of claim 6, wherein said second air system supplies air into a collecting portion of the exhaust manifold.

8. The system of claim 4, wherein said mechanical driving connection for driving said air pump includes a cam driven by said output shaft and said air pump is a cam-driven diaphragm pump.

* * * * *